No. 873,780. PATENTED DEC. 17, 1907.
C. F. PETERSON.
INSULATED COIL.
APPLICATION FILED JUNE 22, 1907.
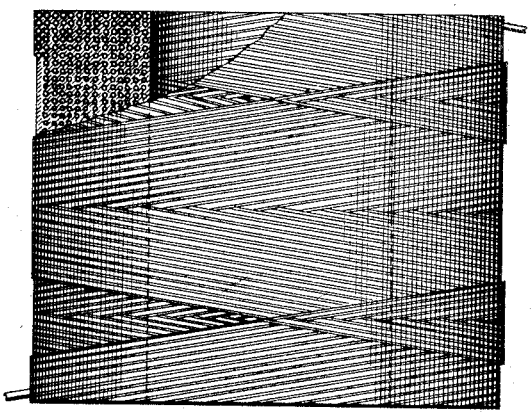
WITNESSES
W. Ray Taylor.
J. Ellis Glenn
INVENTOR
CHARLES F. PETERSON.
by
ATTY.

UNITED STATES PATENT OFFICE.

CHARLES F. PETERSON, OF SCHENECTADY, NEW YORK, ASSIGNOR TO GENERAL ELECTRIC COMPANY, A CORPORATION OF NEW YORK.

INSULATED COIL.

No. 873,780.   Specification of Letters Patent.   Patented Dec. 17, 1907.

Application filed June 22, 1907. Serial No. 380,227.

*To all whom it may concern:*

Be it known that I, CHARLES F. PETERSON, a citizen of the United States, residing at Schenectady, in the county of Schenectady, State of New York, have invented certain new and useful Improvements in Insulated Coils, of which the following is a specification.

This invention relates to a process of forming coils for electrical uses and has for its object the provision of a coil of this character which will be highly refractory and impervious to moisture, the turns being so united as to constitute a fully protected self-contained unit.

In carrying out my invention I wind the conductor into the desired form, as for instance a coil wound on a central core, the turns being separated by some material which may be caused to disappear, as for instance a cotton covering which can be burned out. The conductors preferably run through a bath of the insulating compound as it is being wound so as to thoroughly impregnate the cotton. The coil is then dipped into insulation and heated to a temperature sufficient to burn out the cotton and harden the insulation. The coil is again dipped and fired at a high temperature.

In the accompanying drawings, I have shown a coil which is made in accordance with my invention. This coil is first wound, by what is known as universal or diagonal winding, to the form shown in the drawings. The conductor is covered with a coating which can easily be removed as by burning. I prefer to use for this purpose a conductor which is insulated by a single covering of cotton. This coil of single cotton covered wire is dipped into an insulation which hardens and becomes refractory and impervious to moisture when heated. For this purpose I have found that a material consisting of 2 parts glass, 2 parts mica, 24 parts kaolin and 12 parts slate, all in a finely powdered condition added to 37 parts silicate of soda and 23 parts water serves my purpose. When the coil is impregnated with this material it is heated to a temperature which will burn out the cotton and incidentally harden the insulation. The cotton in burning passes through the insulation and leaves the latter in a porous condition although the turns of the wire are separated. The coil is again plunged into the insulation to fill up the pores and then fired at a temperature of about 400° C. The result is a hard coil of coherent turns of wire which is fireproof and impervious to moisture, the insulating material being a vitrified silicate, which will withstand a high temperature.

It will be understood, of course, that I do not limit my invention to the particular insulating material herein described nor to the specific steps of the process except in so far as it is limited by the scope of the claims annexed hereto.

What I claim as new and desire to secure by Letters Patent of the United States, is,

1. The process of forming coils for electrical uses which consists in winding a covered conductor into a coil and dipping said coil into an insulating material, heating the coil to remove the covering, then again dipping the coil into the material to fill up the pores and firing at a high temperature.

2. The process of forming coils for electrical uses which consists in winding a conductor into a coil with a combustible spacing material between the turns, dipping said coil into an insulating material, heating the coil to burn out the spacing material, again dipping the coil into the insulating material to fill up the pores and then firing at a high temperature.

3. The process of forming coils for electrical uses which consists in winding a conductor into a coil with a combustible spacing material between the turns, dipping said coil into a silicious material, heating the coil to burn out the spacing material, again dipping the coil into the insulating material to fill up the pores and then firing at a high temperature.

4. The process of forming coils for electrical uses which consists in winding a conductor covered with a combustible material into a coil, dipping said coil into a vitreous material, heating the coil to burn out the conductor covering, again dipping the coil into the vitreous material to fill up the pores and then firing at a high temperature.

5. The process of forming coils for electrical uses which consists in winding a conductor into a coil with a combustible spacing material between the turns, dipping said coil into an insulating material comprising kaolin and silicate of soda, heating the coil to burn out the spacing material, again dipping the coil into the insulating material to fill up the pores and then firing at a high temperature.

6. The process of forming coils for electrical uses which consists in winding a cotton covered conductor into a coil, dipping said coil into a silicious insulating material, heating the coil to burn out the cotton covering, again dipping the coil into the material to fill up the pores and then firing at a high temperature.

7. The process of forming coils for electrical uses which consists in winding a conductor covered with a fibrous, combustible material into a coil, dipping said coil into an insulating material comprising kaolin and silicate of soda, heating the coil to burn out the combustible material, again dipping the coil into the insulating material to fill up the pores and then firing at a high temperature.

In witness whereof, I have hereunto set my hand this 19th day of June, 1907.

CHARLES F. PETERSON.

Witnesses:
   HELEN ORFORD,
   BENJAMIN B. HULL.